US010551533B2

(12) United States Patent
Tekolste et al.

(10) Patent No.: US 10,551,533 B2
(45) Date of Patent: *Feb. 4, 2020

(54) METHODS AND SYSTEM FOR CREATING FOCAL PLANES USING AN ALVAREZ LENS

(71) Applicant: MAGIC LEAP, INC., Plantation, FL (US)

(72) Inventors: Robert D. Tekolste, Fort Lauderdale, FL (US); Eric Browy, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,830

(22) Filed: Aug. 6, 2018

(65) Prior Publication Data
US 2019/0041558 A1 Feb. 7, 2019

Related U.S. Application Data

(63) Continuation of application No. 15/004,749, filed on Jan. 22, 2016, now Pat. No. 10,042,097.
(Continued)

(51) Int. Cl.
*G02B 27/22* (2018.01)
*G02B 5/18* (2006.01)
*G02B 27/01* (2006.01)

(52) U.S. Cl.
CPC ......... *G02B 5/1871* (2013.01); *G02B 5/1814* (2013.01); *G02B 5/1828* (2013.01);
(Continued)

(58) Field of Classification Search
CPC .. G02B 2/1871; G02B 5/1814; G02B 5/1828; G02B 5/1842; G02B 27/2214;
(Continued)

(56) References Cited

U.S. PATENT DOCUMENTS 5,148,314 A * 9/1992 Chen ............... G02B 5/1876
359/16
6,731,434 B1 * 5/2004 Hua ............... G02B 5/1814
359/619
(Continued)

FOREIGN PATENT DOCUMENTS

WO WO 2014/124707 8/2014

OTHER PUBLICATIONS

Extended European Search Report for EP Appln. No. 16740874.9 dated Sep. 27, 2018.
(Continued)

*Primary Examiner* — William R Alexander
*Assistant Examiner* — Tamara Y. Washington
(74) *Attorney, Agent, or Firm* — Vista IP Law Group LLP

(57) ABSTRACT

Configurations are disclosed for presenting virtual reality and augmented reality experiences to users. The system may comprise a lens assembly comprising two transmissive plates, a first of the two transmissive plates comprising a first surface sag based at least in part on a cubic function, and a DOE to direct image information to a user's eye; wherein the DOE is placed in between the two transmissive plates of the lens assembly, and wherein the DOE is encoded with the inverse of the cubic function corresponding to the surface sag of the first transmissive plate; such that a wavefront created by the encoded DOE is compensated by the wavefront created by the first transmissive plate, thereby collimating light rays associated with virtual content delivered to the DOE.

23 Claims, 10 Drawing Sheets

Related U.S. Application Data

(60) Provisional application No. 62/106,391, filed on Jan. 22, 2015.

(52) U.S. Cl.
CPC ....... *G02B 5/1842* (2013.01); *G02B 27/0172* (2013.01); *G02B 2027/0174* (2013.01)

(58) Field of Classification Search
CPC ............ G02B 27/2228; G02B 27/0172; G02B 27/2242; G02B 7/12
USPC .................................................. 359/462–473
See application file for complete search history.

(56) References Cited

U.S. PATENT DOCUMENTS

| | | | |
|---|---|---|---|
| 9,791,700 B2 | 10/2017 | Schowengerdt | |
| 9,857,591 B2 | 1/2018 | Welch et al. | |
| 2008/0285140 A1* | 11/2008 | Amitai | G02B 6/0056 359/630 |
| 2008/0297731 A1* | 12/2008 | Powell | G03B 21/26 353/37 |
| 2010/0149073 A1* | 6/2010 | Chaum | G02B 27/0093 345/8 |
| 2012/0113092 A1* | 5/2012 | Bar-Zeev | G02B 27/017 345/419 |
| 2012/0021848 A1 | 8/2012 | Popovich et al. | |
| 2012/0218481 A1* | 8/2012 | Popovich | G02B 5/1819 349/11 |
| 2013/0070204 A1* | 3/2013 | Johansson | A61B 3/024 351/224 |
| 2013/0314793 A1* | 11/2013 | Robbins | G02B 5/18 359/573 |
| 2014/0071539 A1 | 3/2014 | Gao | |
| 2014/0211148 A1* | 7/2014 | Crosby | G02C 7/028 351/159.7 |
| 2015/0205126 A1 | 7/2015 | Schowengerdt | |
| 2015/0346495 A1 | 12/2015 | Welch et al. | |

OTHER PUBLICATIONS

PCT International Search Report and Written Opinion for International Appln. No. PCT/US2016/014616, Applicant Magic Leap, Inc., forms PCT/ISA/210, 220, and 237, dated Mar. 24, 2016 (14 pages).

International Preliminary Report on Patentability for International Appln. No. PCT/US2016/014616, Applicant Magic Leap, Inc., dated Aug. 3, 2017 (9 pages).

Response to Extended European Search Report filed Apr. 25, 2019 for EP application No. 16740874.9, Applicant Magic Leap, Inc. 80 pages.

Office Action dated Jun. 27, 2019 for Chinese application No. 201680017311.6, Applicant Magic Leap, Inc. 21 pages, in Chinese with English translation.

Response to Foreign Office Action for CN Patent Appin. No. 2016800173116 dated Oct. 25, 2019.

Foreign Office Action for JP Patent Appin. No. 2017-538420 dated Nov. 25, 2019.

\* cited by examiner

100

104 — Negative power

102 — Zero power

106 — Positive power

FIG. 1

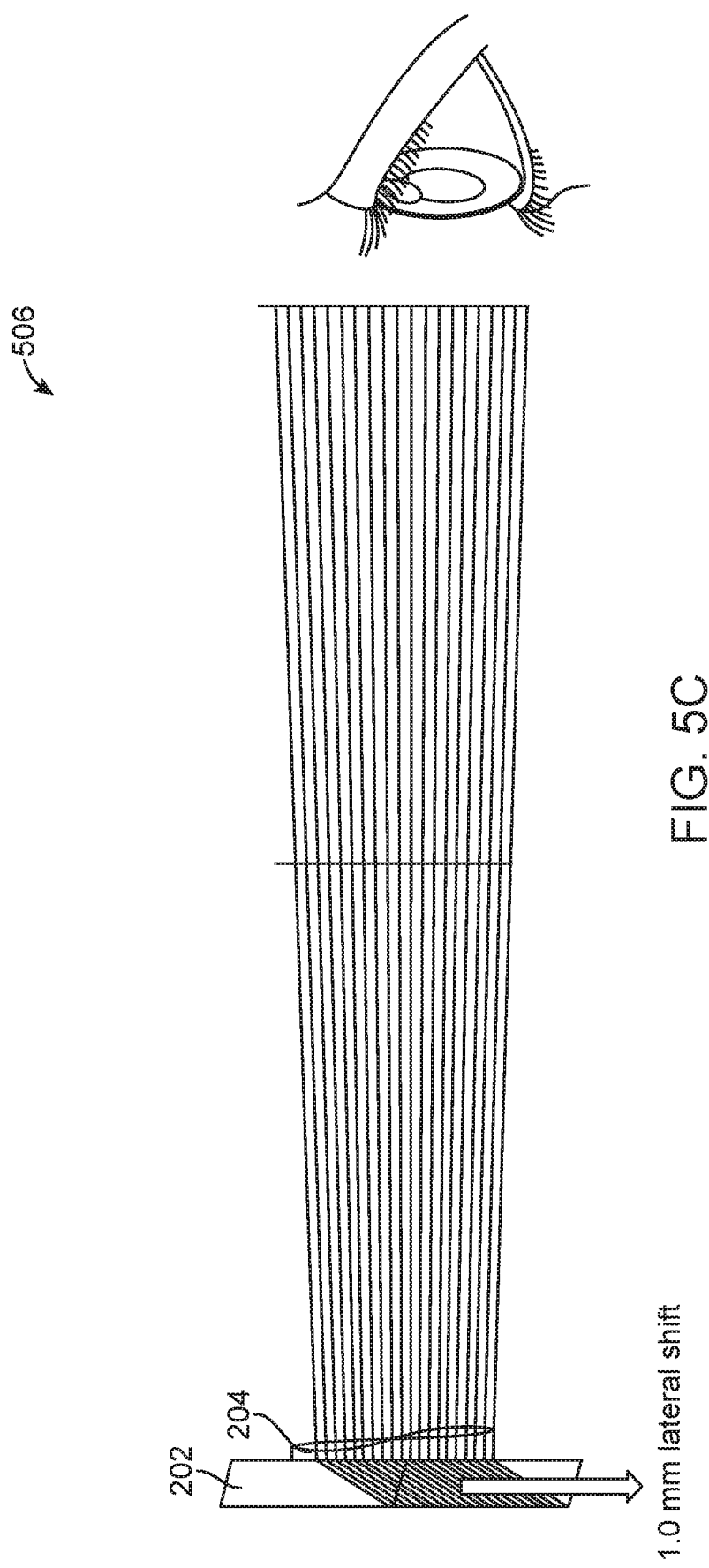

METHODS AND SYSTEM FOR CREATING FOCAL PLANES USING AN ALVAREZ LENS

CROSS-REFERENCE TO RELATED APPLICATION(S)

This application is a continuation of U.S. patent application Ser. No. 15/004,749, filed Jan. 22, 2016 entitled "METHODS AND SYSTEM FOR CREATING FOCAL PLANES USING AN ALVAREZ LENS", which claims priority to U.S. Provisional Application Ser. No. 62/106,391 filed on Jan. 22, 2015 entitled "METHODS AND SYSTEM FOR CREATING FOCAL PLANES USING AN ALVAREZ LENS,". This application is cross-related to U.S. patent application Ser. No. 14/726,429 filed on May 29, 2015 entitled "METHODS AND SYSTEMS FOR CREATING FOCAL PLANES IN VIRTUAL AND AUGMENTED REALITY," and U.S. patent application Ser. No. 14/555,585 filed on Nov. 27, 2014 entitled "VIRTUAL AND AUGMENTED REALITY SYSTEMS AND METHODS,". The contents of the aforementioned patent applications are hereby expressly and fully incorporated by reference in their entirety for all purposes, as though set forth in full.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

There are numerous challenges when it comes to presenting 3D virtual content to a user of an AR system. A central premise of presenting 3D content to a user involves creating a perception of multiple depths. In other words, it may be desirable that some virtual content appear closer to the user, while other virtual content appear to be coming from farther away. Thus, to achieve 3D perception, the AR system should be configured to deliver virtual content at different focal planes relative to the user.

There may be many different ways to generate various focal planes in the context of AR systems. Some example approaches are provided in U.S. patent application Ser. No. 14/726,429 filed on May 29, 2015 entitled "METHODS AND SYSTEMS FOR CREATING FOCAL PLANES IN VIRTUAL AND AUGMENTED REALITY," and U.S. patent application Ser. No. 14/555,585 filed on Nov. 27, 2014 entitled "VIRTUAL AND AUGMENTED REALITY SYSTEMS AND METHODS,", incorporated by reference above. The design of these virtual reality and/or augmented reality systems presents numerous challenges, including the speed of the system in delivering virtual content, quality of virtual content, eye relief of the user, size and portability of the system, and other system and optical challenges.

The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users.

In one aspect, an augmented reality (AR) display system for delivering augmented reality content to a user is disclosed. The AR display system comprises an image-generating source to provide one or more frames of image data, a light modulator to transmit light associated with the one or more frames of image data, a lens assembly comprising first and second transmissive plates, the first and second transmissive plates each having a first side and a second side that is opposite to the first side, the first side being a plano side, and the second side being a shaped side, the second side of the first transmissive plate comprising a first surface sag based at least in part on a cubic function, and the second side of the second transmissive plate comprising a second surface sag based at least in part on an inverse of the cubic function, and a diffractive optical element (DOE) to receive the light associated with the one or more frames of image data and direct the light to the user's eyes, the DOE being disposed between and adjacent to the first side of the first transmissive plate and the first side of the second transmissive plate, and wherein the DOE is encoded with refractive lens information corresponding to the inverse of the cubic function such that when the DOE is aligned such that the refractive lens information of the DOE cancels out the cubic function of the first transmissive plate, a wavefront of the light created by DOE is compensated by the wavefront created by the first transmissive plate, thereby generating collimated light rays associated with virtual content delivered to the DOE.

The AR system may further comprise an actuator to laterally translate the DOE relative to the lens assembly, in one or more embodiments. In one or more embodiments, the DOE is laterally translated in relation to the lens assembly on a frame-to-frame basis. In one or more embodiments, the system further comprises an eye tracking module to track a vergence of the user's eyes, wherein the DOE is laterally translated relative to the lens assembly based at least in part on the tracked vergence.

In one or more embodiments, the lateral displacement of the DOE causes the light rays emanating from the DOE to appear to diverge from a depth plane, wherein the depth plane is not an infinite depth plane. In one or more embodiments, collimated light rays appear to emanate from infinity.

In one or more embodiments, the second transmissive plate is placed in relation to the first transmissive plate with their respective vertices on an optical axis such that light associated with outside world objects, when viewed by the user are perceived as having zero optical power. In one or more embodiments, the AR system further comprises another actuator to laterally translate the second transmissive plate in relation to the first transmissive plate. In one or more embodiments, the second transmissive plate is laterally offset in a first direction in relation to the first transmissive plate such that light associated with outside world objects, when viewed by the user, is perceived as having a positive optical power.

In one or more embodiments, the second transmissive plate is laterally offset in a second direction in relation to the first transmissive plate such that light associated with outside world objects, when viewed by the user, is perceived as having a negative optical power. In one or more embodiments, the image generating source delivers the one or more frames of image data in a time-sequential manner.

In another aspect, a method of generating different focal planes is disclosed. The method comprises delivering light associated with one or more frames of image data to a diffractive optical element (DOE), the DOE disposed between a lens assembly comprising two transmissive plates, each of the transmissive plates having a first side and a second side that is opposite to the first side, the first side being a plano side, and the second side being a shaped side, the second side of the first transmissive plate comprising a first surface sag based at least in part on a cubic function, and the second side of the second transmissive plate comprising a second surface sag based at least in part on an inverse of the cubic function, the DOE being disposed between and adjacent to the first side of the first transmissive plate and the first side of the second transmissive plate, and wherein the DOE is encoded with refractive lens information corresponding to the inverse of the cubic function such that when the DOE is aligned such that the refractive lens information of the DOE cancels out the cubic function of the first transmissive plate, a wavefront of the light created by DOE is compensated by the wavefront created by the first transmissive plate, thereby generating collimated light rays associated with virtual content delivered to the DOE.

In one or more embodiments, the method further comprises laterally translating the DOE in relation to the first transmissive plate such that light rays associated with the virtual content delivered to the DOE diverge at varying angles based at least in part on the lateral translation.

In one or more embodiments, the divergent light rays are perceived by the user as coming from a depth plane other than optical infinity. In one or more embodiments, the method further comprises tracking a vergence of the user's eye, wherein the DOE is laterally translated based at least in part on the tracked vergence of the user's eyes.

In one or more embodiments, the second transmissive plate is placed in relation to the DOE and the first transmissive plate such that outside world objects, when viewed by the user through the lens assembly and the DOE, are perceived through zero optical power. In one or more embodiments, the second transmissive plate is offset in a first direction in relation to the DOE and the first transmissive plate such that outside world objects, when viewed by the user through the lens assembly and the DOE are perceived as having a positive optical power.

In one or more embodiments, the second transmissive plate is offset in a second direction in relation to the DOE and the first transmissive plate such that outside world objects, when viewed by the user through the lens assembly and the DOE are perceived as having a negative optical power. In one or more embodiments, the first direction is opposite to the second direction.

In one or more embodiments, the collimated lights rays associated with the virtual content appear to emanate from optical infinity. In one or more embodiments, the method further comprises delivering one or more frames of virtual content to the DOE in a time-sequential manner. In one or more embodiments, the DOE is laterally translated in relation to the first transmissive plate on a frame-to-frame basis.

In one or more embodiments, the one or more frames of virtual content delivered to the DOE comprise two-dimensional image slices of one or more three-dimensional objects.

In yet another aspect, an augmented reality display system comprises a lens assembly comprising two transmissive plates of an Alvarez lens, a first of the two transmissive plates comprising a first surface sag based at least in part on a cubic function, and a second of the two transmissive plates comprising a second surface sag based at least in part on an inverse of the cubic function such that when the two transmissive plates are disposed with their respective vertices on an optical axis, an induced phase variation of the first transmissive plate is canceled out by the second transmissive plate, and a DOE to receive and direct image information pertaining to virtual content to a user's eye, wherein the DOE is disposed between the first and second transmissive plates of the Alvarez lens, and wherein the DOE is encoded with the inverse of the cubic function corresponding to the first surface sag of the first transmissive plate, such that, when the DOE is aligned with the first transmissive plate, a wavefront created by the encoded DOE is compensated by the wavefront created by the first transmissive plate, thereby collimating light rays associated with virtual content delivered to the DOE.

In one or more embodiments, the DOE is laterally translated in relation to the first transmissive plate such that the light rays exiting the lens assembly are divergent. In one or more embodiments, the augmented reality display system further comprises an eye tracking module to track a vergence of the user's eyes, wherein the DOE is laterally translated based at least in part on the tracked vergence of the user's eyes.

In one or more embodiments, the divergent light rays appear to diverge from a depth plane other than optical infinity. In one or more embodiments, the collimated light rays appear to emanate from optical infinity.

In one or more embodiments, the second transmissive plate is placed in relation to the first transmissive plate with their respective vertices on an optical axis such that light associated with outside world objects, when viewed by the user are perceived as having zero optical power. In one or more embodiments, the second transmissive plate is offset in a first direction in relation to the first transmissive plate such that light associated with outside world objects, when viewed by the user, are perceived as having a positive optical power.

In one or more embodiments, the second transmissive plate is offset in a second direction in relation to the first transmissive plate such that light associated with outside world objects, when viewed by the user, are perceived as having a negative optical power, wherein the second direction is opposite to the first direction.

In one or more embodiments, the augmented reality display system further comprises an image generating source, wherein the image generating source delivers one or more frames of image data in a time-sequential manner. In one or more embodiments, the DOE is laterally translated in relation to the first transmissive plate on a frame-to-frame basis.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1 illustrates a plan view of an Alvarez lens in three different configurations.

FIGS. 5A-5C illustrate various configurations in which the DOE goes through different lateral translations in relation to the Alvarez lens.

DETAILED DESCRIPTION

Figure 2:
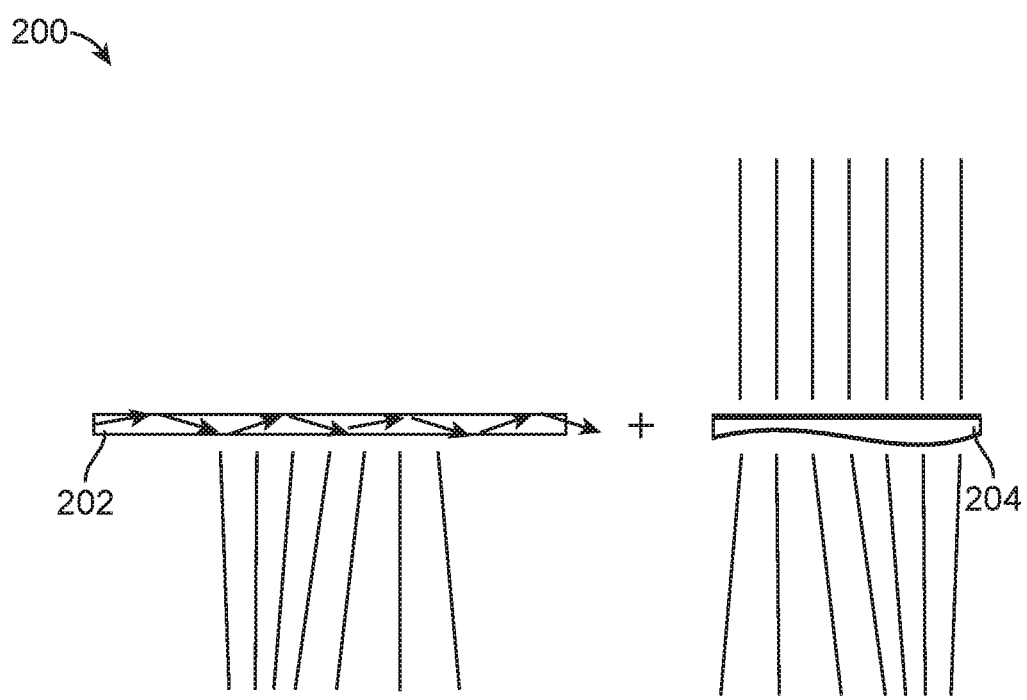
FIG. 2 illustrates a plan view of a diffractive optical element (DOE) encoded with refractive lens information and one transmissive plate of the Alvarez lens.

Various embodiments of the invention are directed to methods, systems, and articles of manufacture for implementing multi-scenario physically-aware design of an electronic circuit design in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are methods and systems for generating virtual and/or augmented reality. In order to provide a realistic and enjoyable virtual reality (VR) or augmented reality (AR) experience, virtual content should be presented at varying depths away from the user such that the virtual content is perceived to be realistically placed or originating from a real-world depth (in contrast to traditional 2D displays). This approach closely mimics the real world experience of sight, in that the eyes constantly change focus in order to view different objects at different depths. For example, muscles of the human eye "tighten" in order to focus on a nearby object, and "relax" in order to focus on an object that is farther away.

By placing virtual content in a manner that closely mimics real objects, the user's natural physiological response (e.g., different focus for different objects) remains substantially intact, thereby providing a more realistic and comfortable viewing experience. This is in contrast to traditional VR or AR systems that force the user to view virtual content on a fixed depth plane (e.g., 2D screen like Google Glass® or Oculus®), forcing the user to go back and forth between real objects of the real world and the virtual content, which causes discomfort to the user. The present application discusses various AR system approaches to project 3D virtual content such that it is perceived at varying depths by the user.

In order to present 3D virtual content to the user, the augmented reality (AR) system projects images of the virtual content at varying depth planes in the z direction from the user's eyes. In other words, the virtual content presented to the user not only changes in the x and y direction (as is the case with most 2D content), but it may also change in the z direction, giving a perception of 3D depth. Thus, the user may perceive a virtual object to be very close (e.g., a virtual book placed on a real desk) or at an infinite distance (e.g., a virtual tree at a very large distance away from the user) or any distance in between. Or, the user may perceive multiple objects simultaneously at different depth planes. For example, the user may see a virtual dragon appear from infinity and running towards the user. In another embodiment, the user may simultaneously see a virtual bird at a distance of 1 meter away from the user and a virtual coffee cup at arm's length from the user.

There may be two main ways of creating a perception of variable depth: multiple-plane focus systems and variable plane focus systems. In a multiple-plane focus system, the system is configured to project virtual content on fixed depth planes in the z direction away from the user. In a variable plane focus system, the system projects one or more depth planes, but moves the depth plane(s) in the z direction to create 3D perception. In one or more embodiments, a variable focus element (VFE) may be utilized to change the focus of light associated with virtual content, such that the light appears to be coming from a particular depth. In other embodiments, hardware components corresponding to different foci may be strategically employed to create a perception of multiple depth planes, as will be discussed in further detail below. The VFE may vary the focus of the light on a frame-by-frame basis. More details on various types of multiple-plane and variable plane focus systems may be found in U.S. application Ser. No. 14/726,429, entitled "METHODS AND SYSTEMS FOR CREATING FOCAL PLANES IN VIRTUAL AND AUGMENTED REALITY" and filed on May 29, 2015, which was incorporated by reference above for all purposes.

In one embodiment of a multiple-plane focal system, various focal planes are generated through the user of diffractive optical elements (DOE) (e.g., volume phase holograms, surface relief diffractive elements, etc.) that are encoded with depth plane information. In one or more embodiments, a DOE refers to a physical light guiding optical element encoded with a light guiding pattern.

In this approach, a wavefront may be encoded within the DOE such that when a collimated beam is totally internally reflected along the DOE, it intersects the wavefront at multiple locations. To explain, collimated light associated with one or more virtual objects is fed into the DOE which acts as a light guide. Due to the wavefront or refractive lens information that is encoded into the DOE, the light that is totally internally reflected within the DOE will intersect the DOE structure at multiple points, and diffract outwards toward the user through the DOE. In other words, the light associated with the one or more virtual objects is transformed based on the encoded refractive lens information of the DOE. Thus, it can be appreciated that different wavefronts may be encoded within the DOE to create different diffraction patterns for light rays that are fed into the DOE. A first DOE may have a first wavefront that produces a first divergence angle for light rays exiting the DOE. This may cause the user to perceive any delivered virtual content at a first depth plane. Similarly, a second DOE may have a second wavefront that produces a second divergence angle for light rays exiting the DOE. This may cause the user to perceive the delivered virtual content at a second depth plane. In yet another example, a DOE may be encoded with a wavefront such that it delivers collimated light to the eye. Since the human eye perceives collimated light as light coming from infinity, this DOE may represent the infinity plane.

As discussed above, this property of DOEs that are encoded with different wavefronts may be used to create various depth planes when perceived by the eye. For example, a DOE may be encoded with a wavefront that is representative of a 0.5 meter depth plane such that the user perceives the virtual object to be coming from a distance of 0.5 meters away from the user. Another DOE may be encoded with a wavefront that is representative of a 3 meter depth plane such that the user perceives the virtual object to be coming from a distance of 3 meters away from the user. By using a stacked DOE assembly, it can be appreciated that multiple depth planes delivering different virtual content may be created for the AR experience, with each DOE configured to display virtual images at a respective depth plane. In one embodiment, six stacked DOEs may be used to generate six depth planes.

It should be appreciated that the stacked DOEs may be further configured to be dynamic, such that one or more DOEs may be turned on or off. In one embodiment, one or more DOEs are switchable between "on" states in which they actively diffract, and "off" states in which they do not significantly diffract. For instance, a switchable DOE may comprise a layer of polymer dispersed liquid crystal, in which microdroplets comprise a wavefront in a host medium, and the refractive index of the microdroplets can be switched to substantially match the refractive index of the host material (in which case the wavefront does not appreciably diffract incident light) or the microdroplet can be switched to an index that does not match that of the host medium (in which case the wavefront actively diffracts incident light). More details on DOEs are described in U.S. patent application Ser. No. 14/555,585 filed on Nov. 27, 2014 and entitled "VIRTUAL AND AUGMENTED REALITY SYSTEMS AND METHODS", incorporated by reference above for all purposes.

In one or more embodiments, the stacked DOE assembly system may be coupled with an eye-tracking sub-system. The eye-tracking sub-system comprises a set of hardware and software components that is configured to track a movement of the user's eyes to determine that user's current point (and depth) of focus. Any type of eye-tracking sub-system may be used. For example, one example eye-tracking system tracks a vergence of the user's eyes to determine a user's current depth of focus. Other eye-tracking sub-systems may user other suitable methods. This information pertaining to the user's current state of focus may, in turn, be used to determine which of the multiple DOEs should be turned on or off at any given point in time. For example, if it is determined that the user is currently looking at an object that is 3 meters away, one or more DOEs that are configured to display virtual content at (or around) 3 meters may be turned off, while the remaining DOEs are turned off. It should be appreciated that the above configurations are example approaches only, and other configurations of the stacked DOE system may be similarly used.

Although the stacked DOE assembly is effective in creating different depth planes at fixed distances away from the user (e.g., ⅓ diopter, ½ diopter, optical infinity, etc.), it may be somewhat bulky for some AR applications. Although any number of DOEs may be stacked to create the stacked DOE assembly, typically at least six DOEs are stacked together to give the user an illusion of full 3D depth. Thus, this may give the system a rather bulky look rather than a look of a sleek optical system. Also, stacking multiple DOEs together adds to the overall weight of the AR system.

Moreover, it should be appreciated that this type of multiple focal plane system generates fixed depth planes at fixed distances away from the user. For example, as described above, a first depth plane may be generated at ⅓ diopter away from the user, a second may be generated at ½ diopter away, etc. While this arrangement may be configured such that it is accurate enough when turning on the right depth plane based on the user's focus, it can be appreciated that the user's eyes still have to slightly change focus to the fixed depth plane projected by the system.

To explain, let's assume that the stacked DOE system comprises 6 stacked DOEs (e.g., ⅓ diopter, ½ diopter, 1 diopter, 2 diopters, 4 diopters and optical infinity), and the user's eyes are focused at a distance of 1.1 diopters. Based on input received through the eye-tracking system, the third DOE element (1 diopter) may be switched on, and virtual content may be delivered at a depth of 1 diopter away. This requires the user to subtly change focus from his/her original focus of 1.1 diopter to 1 diopter to appreciate the virtual content being delivered. Thus, rather than creating a depth plane at 1.1 diopters, which coincides with the user's focus, the system forces the user to slightly change focus to the depth plane created by the system. This may produce some discomfort to the user. The following disclosure presents methods and systems to use DOEs in a variable plane focus system rather than a multi-plane focus system, such that only a single depth plane is created to coincide with the vergence of the user's eyes (detected by the eye-tracking sub system). Additionally, using a single DOE instead of six may make the system less bulky and more aesthetically pleasing. Further, in some systems that utilize multiple fixed depth planes, it may be difficult to transition from one depth plane to another depth plane when projecting a moving virtual object. It may be difficult to handle the transitioning of one depth plane to another (e.g., an object moving closer to the user) more seamlessly through a system that continuously adjusts the depth of the virtual object rather than jumps from one fixed depth plane to another fixed depth plane.

To this end, a single DOE encoded with depth information may be coupled to an Alvarez lens, as will be described further below. An Alvarez lens comprises two transmissive refractive plates, each of the two transmissive plates having a plano surface and a surface shaped in a two-dimensional cubic profile (e.g., surface sag). The plano surface may be a substantially flat surface, in one or more embodiments. Typically, the two cubic surfaces are made to be the inverse of each other such that when both transmissive plates are placed with their respective vertices on the optical axis, the phase variations induced by the two transmissive plates cancel each other out. The phase contours of the Alvarez lens typically result from a cubic function or polynomial function similar to $S=a(y^3+3x^2y)$. S represents the surface sag of the Alvarez lens. It should be appreciated that the actual cubic function may be different based on the application for which the Alvarez lens is designed. For example, depending on the nature of the AR application (e.g., number of depth planes, type of depth planes, type of virtual content, etc.), the actual mathematical function with which the surface sag of the transmissive plates is created may be changed. For example, the "a" in the equation above may be different for different types of AR devices. Similarly, any of the other variables of the equation above may be changed as well. In one or more embodiments, the surface sag of the Alvarez lens is based on a cubic function in one direction, and the $x^2y$ function in the other direction. With the transmissive plates created using this combined mathematical function, the transmissive plates are able to be focused in both directions.

Further, the surface sag may also be created using mathematical terms in addition to the main mathematical equation described above. The additional sag terms may take the form of $Ax^2+By^2+Cy^3$, etc. These additional functions may help optimize the surface sag for ray tracing optimization. Ray tracing optimization is used to adjust the coefficients until a better outcome is obtained. It should be appreciated that these terms may create small perturbations on the basic surface sag of the Alvarez lens, but could result in better performance for AR purposes.

Referring now to the configurations 100 shown in FIG. 1, as discussed briefly above, when the two plates of the Alvarez lens are placed such that their vertices are on the optical axis (102), the induced phase variations cancel each other out, thereby making the Alvarez lens have zero power. In other words, if a user were to look through the Alvarez lens in a configuration such as that depicted in 102, the user would simply see through the lens as if looking through a transparent piece of glass.

However, if the two transmissive plates undergo a relative lateral translation, such as that shown in 104 or 106, a phase variation is induced, resulting in either negative power (104) or positive power (106). The resulting phase variation is the differential of the cubic surface profiles, resulting in a quadratic phase profile, or optical power. As shown in FIG. 1, the optical power may either be positive power or negative power. It can be appreciated that the magnitude of the power may vary based on the cubic function corresponding to the contours of the Alvarez Lens, as discussed above.

In one embodiment, the Alvarez lens is coupled to a single DOE (e.g., volumetric phase grating, surface relief DOE, etc.) such that the assembly as a whole helps create multiple depth planes for presenting virtual content in 3D to the user. More particularly, rather than encoding a particular depth plane information (i.e., refractive lens information) in the DOE, it is instead encoded with a cubic function (e.g., inverse of the cubic function of a transmissive plate of the Alvarez lens) that compensates for the wavefront on one of the plates of the Alvarez lens. Thus, rather than moving the plates of the Alvarez lens relative to each other, the DOE can be moved relative to both plates of the Alvarez lens to produce different depth planes for the user.

Referring now to the Alvarez lens configuration 200 of FIG. 2, the DOE can be encoded with the inverse of the cubic function of one of the plates of the Alvarez lens, such that it compensates for the refractive lens function of one of the transmissive plates of the Alvarez lens. In the illustrated embodiment, the DOE 202 is encoded such that the light associated with the delivered virtual content exits the DOE 202 in a manner than mimics the inverse of the wavefront of one of the transmissive plates of the Alvarez lens. For illustrative purposes, as shown in FIG. 2, the light exiting the DOE 202 is shown to come out in a pattern, rather than all coming out straight, for example. In the illustrated embodiment, the light exiting one of the transmissive plates 204 is shown to be coming out in a manner that is the opposite of the pattern of light exiting the DOE 202. Since the two patterns constitute mathematical inverses of each other, putting the two patterns together cancels the two resulting wavefronts out such that the light reaching the eye of the user is collimated (e.g., is perceived as coming from infinity. It should be appreciated that the other transmissive plate of the Alvarez lens ensures that the user views a non-distorted image of the desired virtual content such that light from the outside world reaches the user's eye in a non-distorted manner.

Figure 3:
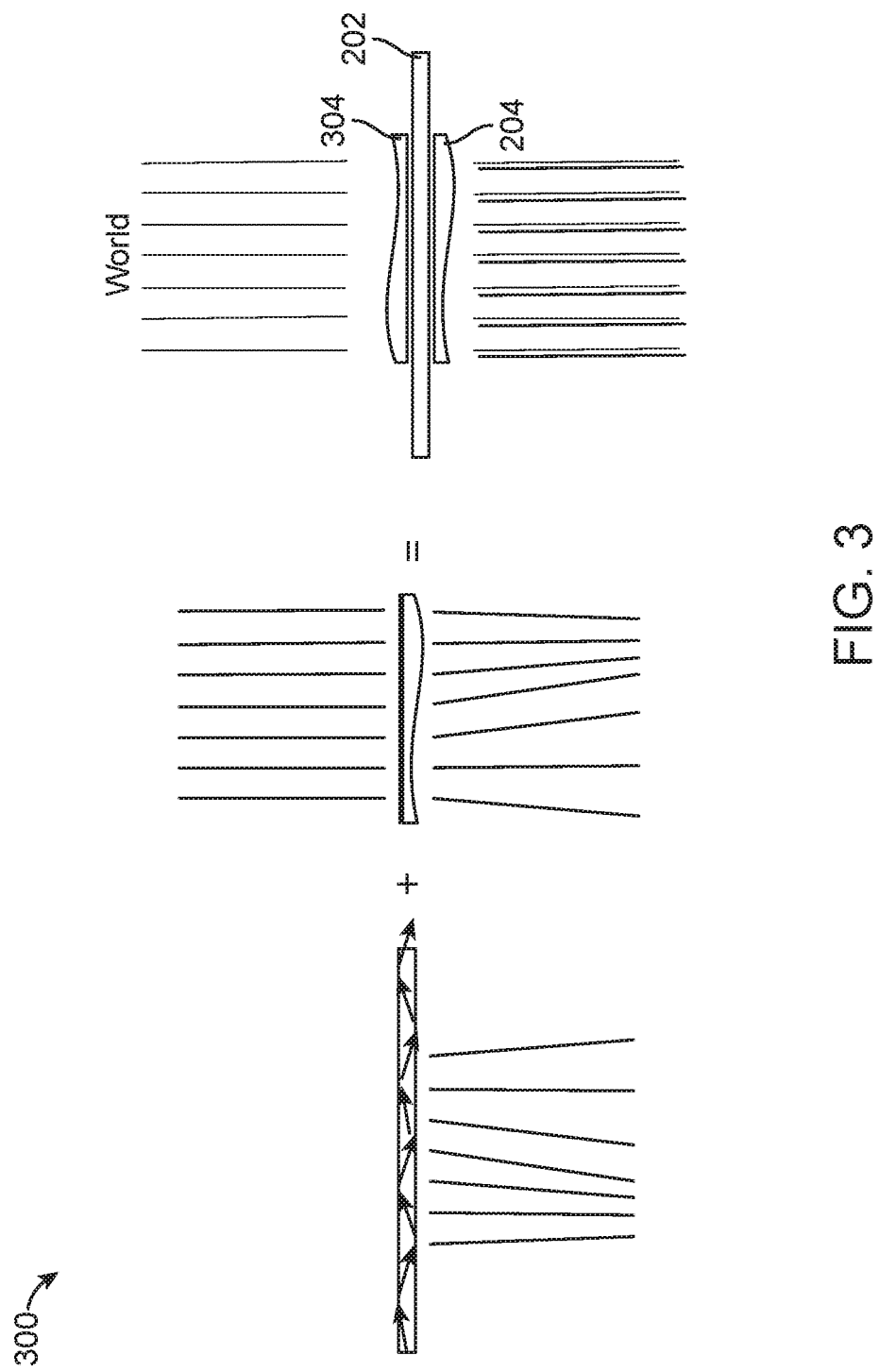
FIG. 3 illustrates an example embodiment of light passing through an optics assembly comprising the DOE and the Alvarez lens of FIG. 1.

In the configuration 300 of the Alvarez lens shown in FIG. 3, the light rays exiting the assembly of the DOE 202 and one of the transmissive plate 204 appear to be collimated rather than having a diverging pattern as shown in FIG. 2 because the wavefront generated by the DOE 202 cancels out the inverse wavefront generated by the transmissive plate 204 and vice versa. Thus, as shown in FIG. 3, the light exiting the combination of the DOE 202 and the transmissive plate 204 is collimated. Since collimated light rays are perceived by the eye as light rays coming from infinity, the user perceives the virtual content as coming from the infinity depth plane.

It should be appreciated that the other transmissive plate 304 is also an integral part of the assembly since it cancels out the wavefront of the transmissive plate 204. Thus, light from the world passes through the refractive pattern of the transmissive plate 304 and is canceled out by the inverse wavefront of the other transmissive plate 204 such that when the user looks through the assembly, he or she views light coming from the world as is, at zero power, as discussed in relation to FIG. 1. As discussed above, the light passing through from the world is unaffected by the DOE, and when the transmissive plates are perfectly aligned, the Alvarez lens is substantially transparent.

In one or more embodiments, the lens assembly and the DOE may further comprise a marking mechanism to denote that the DOE is perfectly aligned with the lens assembly constituting the Alvarez lens such that collimated light is generated. For example, the marking mechanism may simply be a demarcation on the DOE that indicates that the alignment of the demarcation of the DOE with the Alvarez lens (or corresponding markings of the Alvarez lens) will product cancellation of the wavefront (e.g., collimation of light). Similarly, the AR system may detect (e.g., through a sensor, an electromechanical switch, etc.) that the DOE is perfectly aligned with the Alvarez lens through any other suitable mechanism.

Referring back to FIG. 3, and as discussed above, the user views the delivered virtual content at the infinity depth plane (i.e., the light rays reaching the eye are collimated). Thus, if the user's eyes are focused at infinity (as detected by the eye-tracking sub system of the AR device), the optics configuration of FIG. 3 would be effective in projecting light as though coming from the infinity depth plane. However, to project virtual content as though coming from other depth planes, light coming from the optics assembly has to be modified such that it diverges at a desired depth plane.

Figure 4:
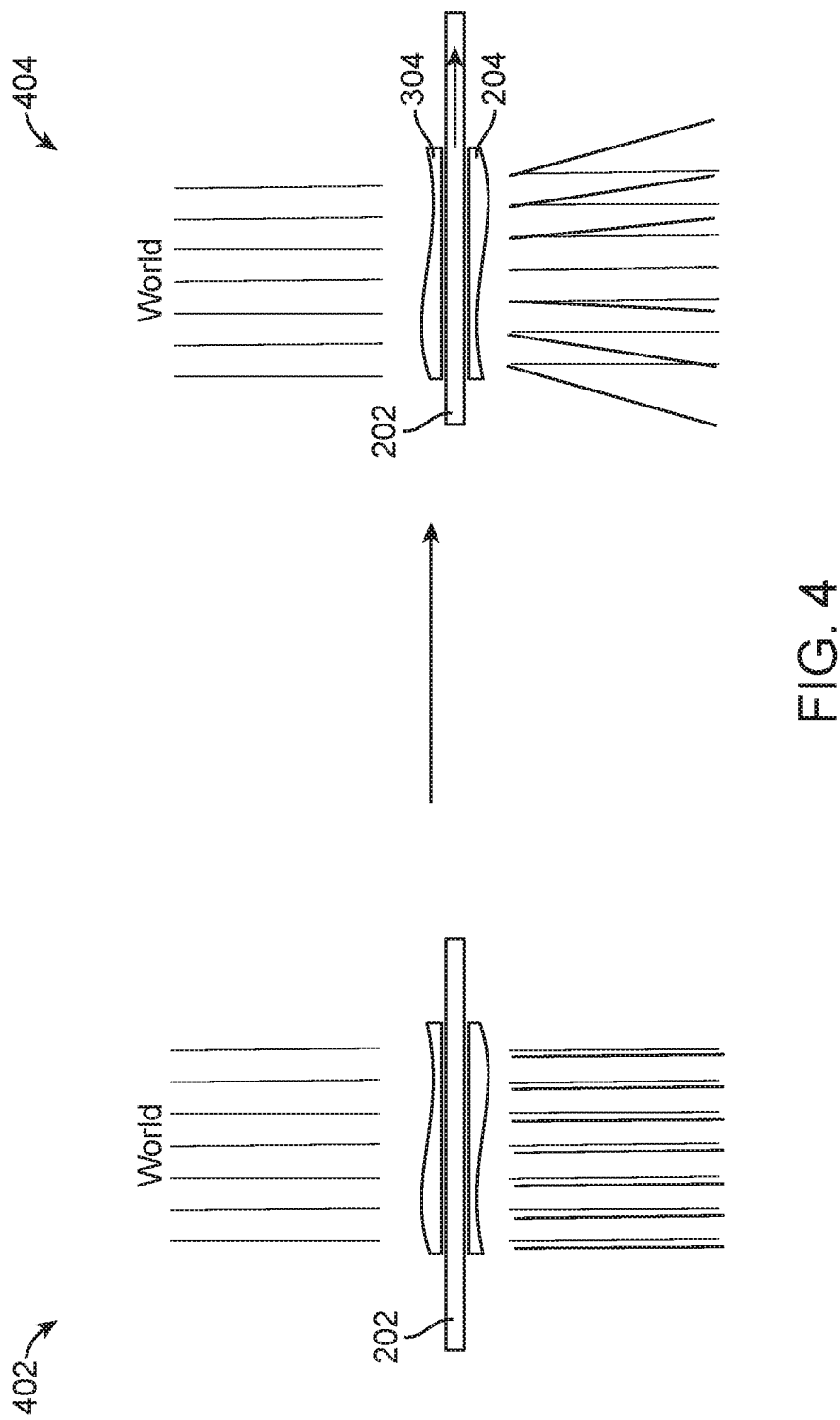
FIG. 4 illustrates an example embodiment of varying depth planes using the optics assembly of FIG. 3.

To that end, the DOE 202 may be laterally translated in relation to the transmissive plates of the Alvarez lens to produce diverging light rays that diverge at a desired depth plane. Referring now to FIG. 4, at 402, the light rays from the world and the light rays associated with the virtual content are both collimated when reaching the eye. Thus, as discussed above, the user perceives the virtual content as though coming from an infinite depth plane. To create this effect, the two transmissive plates 304 and 204 of the Alvarez lens are placed such that they exactly cancel out their respective wavefronts and light from the world appears as is (i.e., zero power), and the DOE 202 is placed directly adjacent to the transmissive plate 204 such that the encoded wavefront of the DOE 202 and the wavefront of the transmissive plate 204 cancel each other out also, thereby producing collimated light of the virtual content that is perceived by the eye to be coming from infinity. Of course it should be appreciated that the placement of the DOE 202 relative to the Alvarez lens has to be precise to create the effect above.

At 404, the DOE 202 is moved laterally to the right relative to the Alvarez lens, thereby changing the wavefront of the outcoupled light rays associated with the virtual content. Since transmissive plates 304 and 204 are still aligned with one another, the user still views objects of the outside world at zero power, but the virtual content is viewed differently, as will be described now. Rather than being collimated, as was the case in 402, the light rays associated with the virtual content fed into the DOE 202 are now divergent. The divergent light rays are perceived by the eye as coming from a particular depth plane. Thus, the delivered virtual content may be perceived to be coming from a distance of 3 meters, or 1.5 meters, or 0.5 meters, depending on the lateral translation of the DOE 202 relative to the transmissive plates 304 and 204 of the Alvarez lens. For example, a slight lateral translation of 0.5 mm may produce divergent light rays such that the virtual content appears to be coming from a distance of 3 meters. Or, in another example, a lateral translation of 1 mm may produce divergent light rays such that the virtual content appears to be coming from a distance of 2 meters (example only). Thus, it can be appreciated that by moving the DOE 202 relative to the Alvarez lens, light rays associated with the virtual content can be manipulated such that they appear to be coming from a desired depth plane.

Figure 5A:
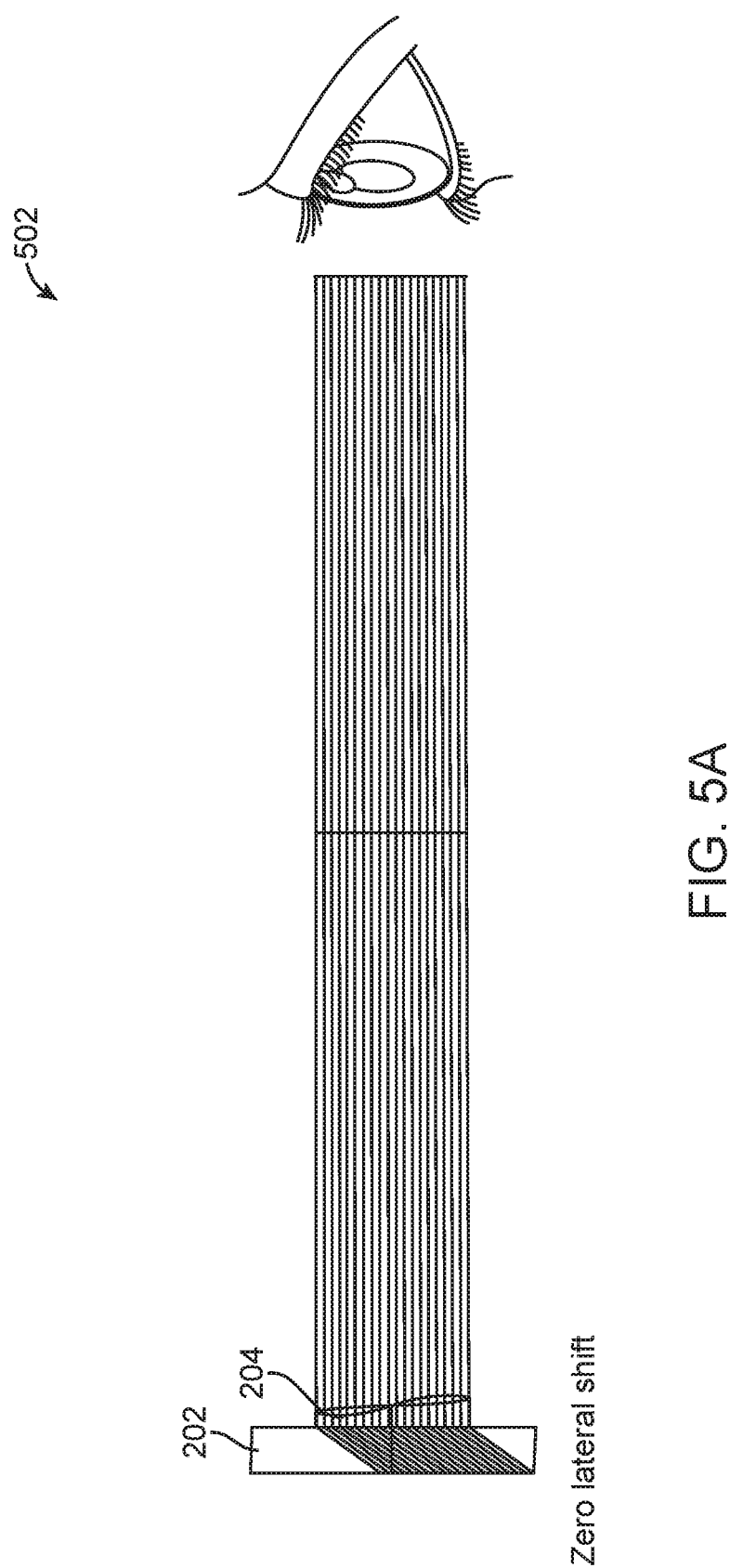
Figure 5B:
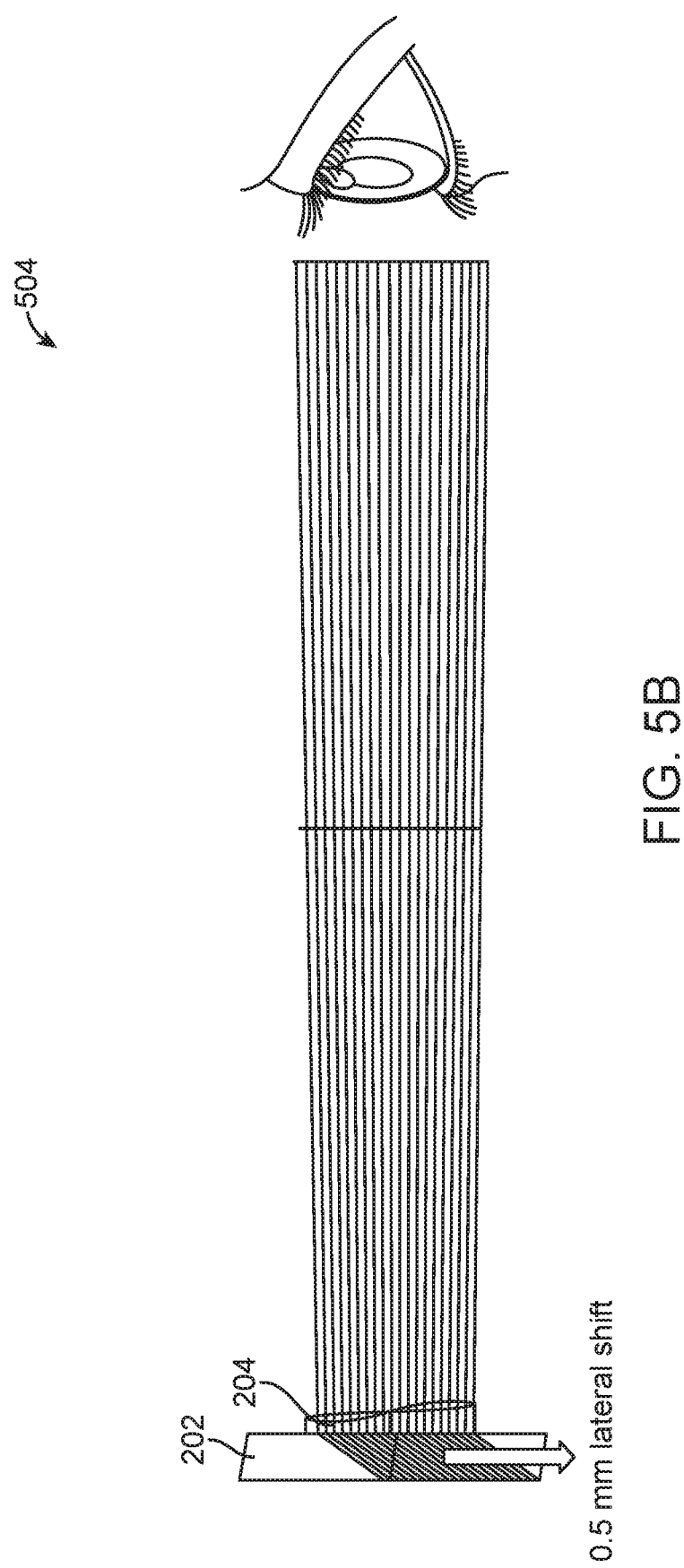

FIGS. 5A-5C illustrate one embodiment of creating multiple depth planes produced by lateral translation of the DOE 202 relative to the Alvarez lens. It should be appreciated that the other transmissive plate 304 illustrated in FIGS. 3 and 4 are omitted in FIGS. 5A-5C solely for illustrative purposes. Other embodiments comprise both transmissive plates of the Alvarez lens such that the DOE 202 is moved relative to both of them.

Referring first to FIG. 5A, at 502, there is zero lateral shift between the DOE 202 and the transmissive plate 204. As shown in FIG. 5A, since there is zero lateral shift between the DOE 202 and the transmissive plate 204, the wavefront of the DOE is completely compensated by the wavefront of the transmissive plate 204, thereby resulting in collimated light reaching the user's eyes. As discussed extensively above, this results in the virtual content being perceived as coming from the infinite depth plane.

Referring now to FIG. 5B, at 504, the DOE 202 is laterally translated (e.g., through an actuator, or any electro-mechanical means) in relation to the Alvarez lens by a lateral shift of 0.5 mm. As a result, the light rays coming out of the optical assembly are not collimated, but rather diverge at a particular angle of divergence when reaching the user's eyes. Thus, the projected virtual content, when viewed by the user, does not appear to be coming from the infinity plane, but rather appears to be coming from a finite depth plane (e.g., 5 ft. away from the user, etc.).

Referring now to FIG. 5C, at 506, the DOE 202 is further laterally translated in relation to the Alvarez lens by a shift of 1 mm. As a result, the light rays coming out of the optical assembly have yet another angle of divergence such that the projected virtual content, when viewed by the user, appears to be coming from another finite depth plane (e.g., 2 ft. away from the user, etc.). Thus, it can be appreciated that moving the DOE 202 in relation to the Alvarez lens helps create multiple depth planes at which to project the desired virtual content.

Figure 6:
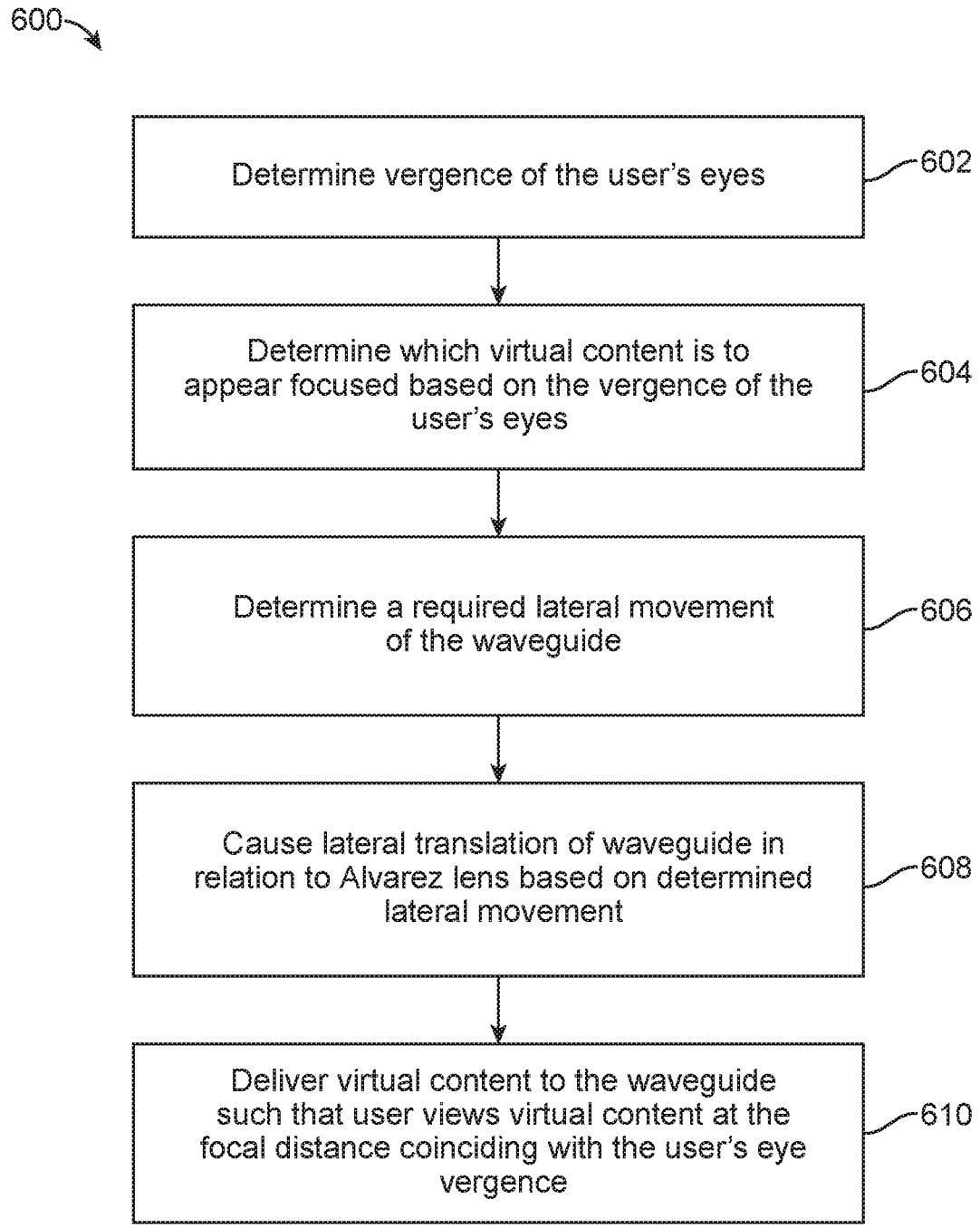
FIG. 6 illustrates an example method of generating depth planes using the optics assembly of FIG. 3.

Referring now to FIG. 6, an example method 600 of creating different focal planes using the optics assembly of FIG. 3 is described. It should be appreciated that the optics assembly of FIG. 3 is part of a larger augmented reality (AR) system that contains other sub-systems (e.g., eye-tracking sub-system, fiber scan display (FSD), image processor, and other control circuitry).

At 602, the AR system determines, through the eye-tracking sub-system, a vergence of the user's eyes. The user's eye vergence may be used to determine where the user's eyes are currently focused. For purposes of accommodation and comfort to the user's eyes, the AR system projects the desired virtual content where the user's eyes are already focused rather than forcing the user to change focus to view the virtual content. This provides for a more comfortable viewing of the virtual content. The determined vergence of the user's eyes dictates a focal distance or focal depth at which to project one or more virtual content to the user.

At 604, the particular virtual content that is to appear in focus at the determined accommodation of the user's eyes is determined. For example, if the user is focused at infinity, it may be determined that a virtual content (e.g., a virtual tree) should appear in focus to the user. The remaining portions of the virtual scene may be blurred through software blurring. Or, it may be determined that the entire set of virtual objects should appear in focus based on the determined accommodation. In that case, all the virtual objects may be prepared for projection to the user.

At 606, the AR system (e.g., through a processor) determines the lateral shift required (i.e., required lateral translation between the DOE 202 and the Alvarez lens) to produce a depth plane at the determined focal distance. This may be performed by searching through a mapping table that stores a correlation between a required lateral shift to effectuate a particular depth plane. Similarly, other such techniques may be similar used.

At 608, based on the determined lateral shift, the DOE 202 is moved relative to the transmissive plates of the Alvarez lens. It should be appreciated that the optics assembly may include a piezo actuator or a voice coil motor (VCM) that physically causes the lateral translation to the desired shift (e.g., 0.5 mm, 1 mm, etc.). In one or more embodiments, a plurality of actuators may be used to shift the DOE with respect to the transmissive plates of the Alvarez lens. In some embodiments, a second actuator may be used to laterally shift one transmissive plate of the Alvarez lens in relation to the other transmissive plate of the Alvarez lens.

At 610, once the lateral shift is completed, virtual content is delivered to the DOE 202. As discussed above, the lateral shift between the DOE and the Alvarez lens produces divergence of the light rays such that the eye perceives the light associated with the virtual content to be coming from a particular depth plane. Or if the user's eyes are focused at infinity, the AR system would align the DOE 202 precisely with the transmissive plates of the Alvarez lens such that the outcoupled light rays are collimated, and the user perceives the light associated with the virtual content as coming from the infinite depth plane. In one embodiment, the virtual content may be fed into the DOE through a fiber scanner display (FSD), a DLP or any other type of spatial light modulator.

Moreover, in yet another application of the Alvarez lens, the transmissive plates may be oriented in a manner that compensates for the user's current optical prescription. To explain, many users of the AR system may have some sort of prescription power that requires them to wear prescription eye glasses or contacts. It may be difficult to wear the AR system on top of eye glasses, or contacts. Thus, the Alvarez lens may be used with the AR system that also compensates for the user's near-sightedness (or far-sightedness) in addition to presenting virtual content at varying depth planes.

Referring back to FIG. 1, and as discussed above, when the two transmissive plates are precisely aligned such that the wavefronts are canceled out, the Alvarez lens has zero power. However, lateral translation of the transmissive plates relative to each other results in either positive or negative power. This can be used in the context of compensation for prescription optical power of users. For example, if a user is near-sighted, the AR system may be designed such that the transmissive plates of the Alvarez lens are slightly offset in relation to each other rather than being perfectly aligned, as was the case in previous example.

Figure 7:
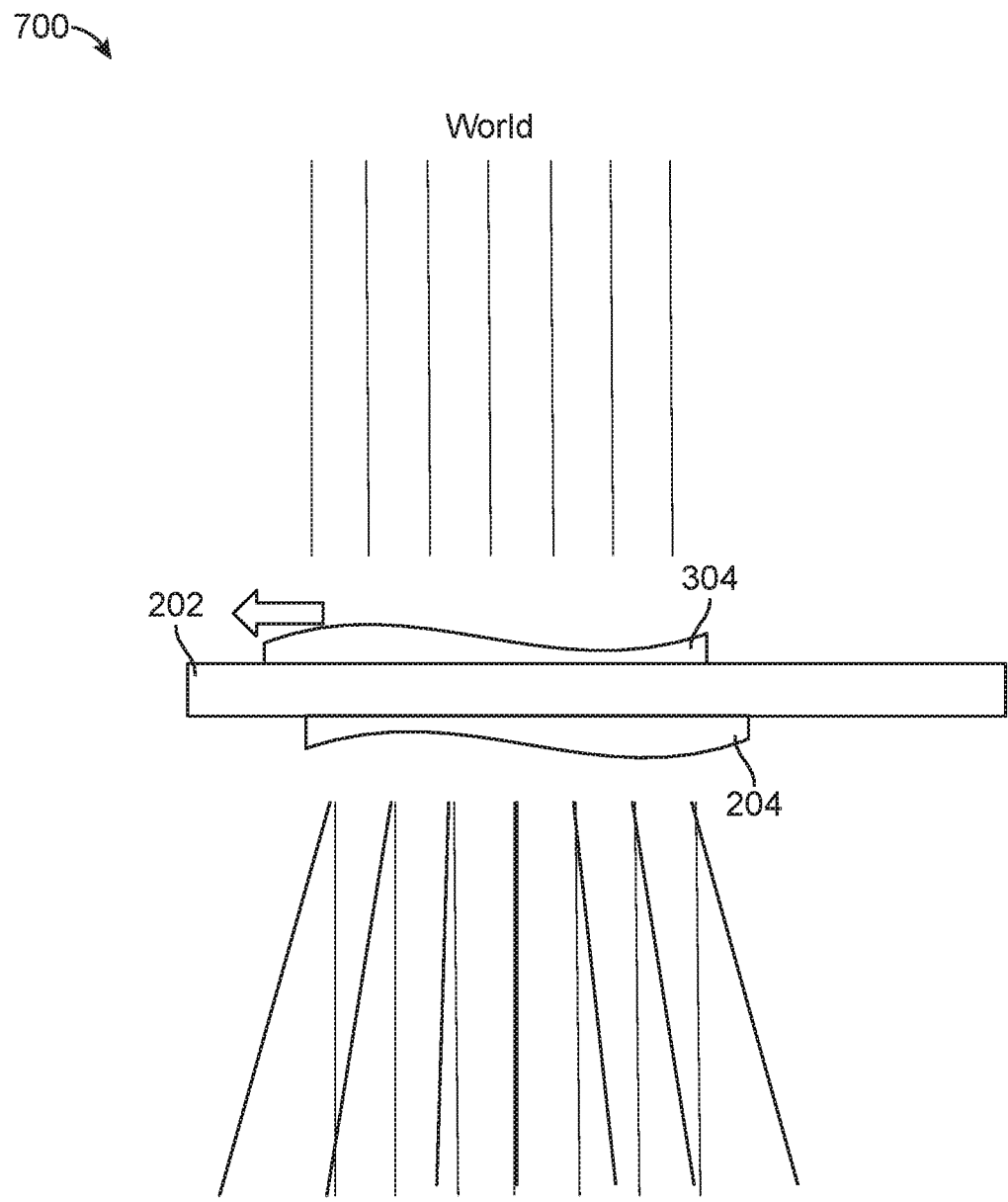
FIG. 7 illustrates an example embodiment of modifying the optics assembly of FIG. 3 to compensate for a user's optical prescription.

In the illustrated embodiment 700 of FIG. 7, rather than being perfectly aligned with each other, as was the case in the examples above, the transmissive plates 304 and 204 are slightly offset, resulting in negative power. Of course, the magnitude of the shift between the plates may be dictated by the user's prescription optical power. For example, a larger shift (or vice versa) may be required for a user having a larger prescription power. Or, a smaller shift (or vice versa) may be sufficient for a user having a smaller prescription power. Given that the optical prescription power is the same, the AR system may be custom designed for each user to compensate for the optical power so that the AR system can be comfortably worn without having to wear additional eye glasses or contacts.

The lateral shift between the transmissive plates may remain constant, in one embodiment. Of course, it should be appreciated that the DOE 202 also moves in relation with the offset transmissive plates as discussed above. Thus, the lateral shift of the DOE 202 in relation to the Alvarez lens creates depth planes at varying distances, and the lateral shift of the transmissive plates of the Alvarez lens creates optical power to compensate for a user's prescription optical power (e.g., near sightedness, far sightedness, etc.)

Figure 8:
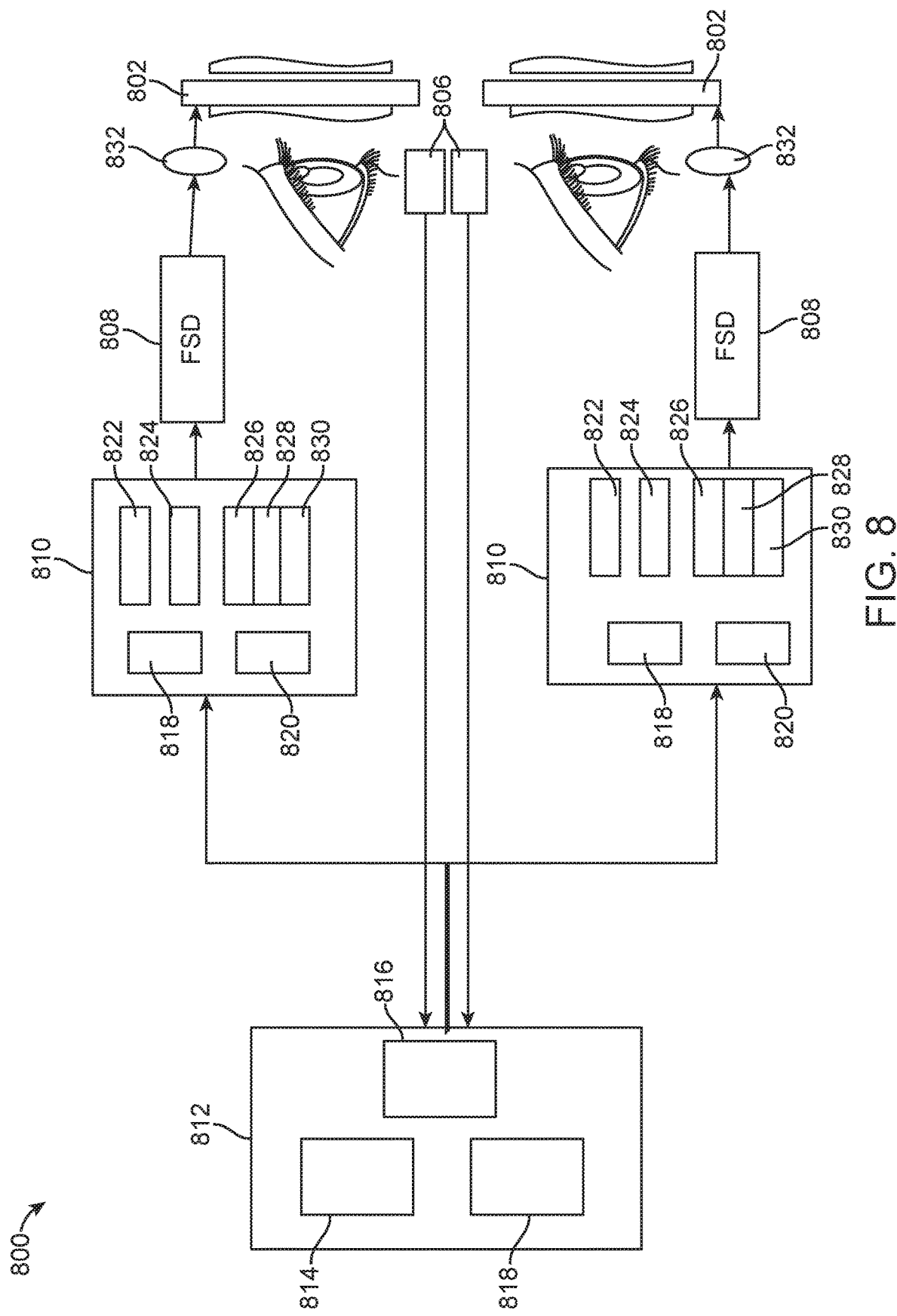
FIG. 8 illustrates a plan view of an example configuration of a system utilizing the optics assembly of FIG. 3.

Referring now to FIG. 8, an example embodiment 800 of the AR system that uses a DOE in combination with the Alvarez lens will now be described. The AR system generally includes an image generating processor 812, at least one FSD 808, FSD circuitry 810, a coupling optic 832, and at least one optics assembly that includes the DOE and the transmissive plates of the Alvarez lens 802. The system may also include an eye-tracking subsystem 808.

As shown in FIG. 8, the FSD circuitry may comprise circuitry 810 that is in communication with the image generation processor 812, a maxim chip 818, a temperature sensor 820, a piezo-electrical drive/transducer 822, a red laser 826, a blue laser 828, and a green laser 830 and a fiber combiner that combines all three lasers 826, 828 and 830.

The image generating processor is responsible for generating virtual content to be ultimately displayed to the user. The image generating processor may convert an image or video associated with the virtual content to a format that can be projected to the user in 3D. For example, in generating 3D content, the virtual content may need to be formatted such that portions of a particular image are displayed on a particular depth plane while other are displayed at other depth planes. Or, all of the image may be generated at a particular depth plane. Or, the image generating processor may be programmed to feed slightly different images to right and left eye such that when viewed together, the virtual content appears coherent and comfortable to the user's eyes. In one or more embodiments, the image generating processor 812 delivers virtual content to the optics assembly in a time-sequential manner. A first portion of a virtual scene may be delivered first, such that the optics assembly projects the first portion at a first depth plane. Then, the image generating processor 812 may deliver another portion of the same virtual scene such that the optics assembly projects the second portion at a second depth plane and so on. Here, the Alvarez lens assembly may be laterally translated quickly enough to produce multiple lateral translations (corresponding to multiple depth planes) on a frame-to frame basis.

The image generating processor 812 may further include a memory 814, a CPU 818, a GPU 816, and other circuitry for image generation and processing. The image generating processor may be programmed with the desired virtual content to be presented to the user of the AR system. It should be appreciated that in some embodiments, the image generating processor may be housed in the wearable AR system. In other embodiments, the image generating processor and other circuitry may be housed in a belt pack that is coupled to the wearable optics.

The AR system also includes coupling optics 832 to direct the light from the FSD to the optics assembly 802. The coupling optics 832 may refer to one more conventional lenses that are used to direct the light into the DOE assembly. The AR system also includes the eye-tracking subsystem 806 that is configured to track the user's eyes and determine the user's focus.

In one or more embodiments, software blurring may be used to induce blurring as part of a virtual scene. A blurring module may be part of the processing circuitry in one or more embodiments. The blurring module may blur portions of one or more frames of image data being fed into the DOE. In such an embodiment, the blurring module may blur out parts of the frame that are not meant to be rendered at a particular depth frame.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other devices that implement virtual or AR or hybrid systems and/or which employ user interfaces, not necessarily the example AR systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An augmented reality (AR) display system for delivering augmented reality content to a user, comprising:
    an image-generating source to provide one or more frames of image data;
    a light modulator to transmit light associated with the one or more frames of image data;
    a lens assembly comprising first and second transmissive plates, the first and second transmissive plates each having a first side and a second side that is opposite to the first side, the first side being a plano side, and the second side being a shaped side, the second side of the first transmissive plate comprising a first surface sag based at least in part on a cubic function, and the second side of the second transmissive plate comprising a second surface sag based at least in part on an inverse of the cubic function; and
    a diffractive optical element (DOE) to receive the light associated with the one or more frames of image data and direct the light to the user's eyes, the DOE being disposed between and adjacent to the first side of the first transmissive plate and the first side of the second transmissive plate, and wherein the DOE is encoded with refractive lens information corresponding to the inverse of the cubic function.

2. The AR system of claim 1, further comprising an actuator to laterally translate the DOE relative to the lens assembly.

3. The system of claim 2, wherein the DOE is laterally translated in relation to the lens assembly on a frame-to-frame basis.

4. The system of claim 2, further comprising an eye tracking module to track a vergence of the user's eyes, wherein the DOE is laterally translated relative to the lens assembly based at least in part on the tracked vergence.

5. The AR system of claim 2, wherein the lateral displacement of the DOE causes the light rays emanating from the DOE to appear to diverge from a depth plane, wherein the depth plane is not an infinite depth plane.

6. The AR system of claim 1, wherein the system generates collimated light rays associated with virtual content that appears to emanate from infinity.

7. The AR system of claim 1, wherein the second transmissive plate is placed in relation to the first transmissive plate with their respective vertices on an optical axis such that light associated with outside world objects, when viewed by the user are perceived as having zero optical power.

8. The AR system of claim 1, further comprising another actuator to laterally translate the second transmissive plate in relation to the first transmissive plate.

9. The AR system of claim 8, wherein the second transmissive plate is laterally offset in a first direction in relation to the first transmissive plate such that light associated with outside world objects, when viewed by the user, is perceived as having a positive optical power.

10. The AR system of claim 8, wherein the second transmissive plate is laterally offset in a second direction in relation to the first transmissive plate such that light associated with outside world objects, when viewed by the user, is perceived as having a negative optical power.

11. The AR system of claim 1, wherein the image generating source delivers the one or more frames of image data in a time-sequential manner.

12. A method of generating focal planes, the method comprising:
    delivering light associated with one or more frames of image data to a diffractive optical element (DOE), the DOE disposed between a lens assembly comprising two transmissive plates, each of the transmissive plates having a first side and a second side that is opposite to the first side, the first side being a plano side, and the second side being a shaped side, the second side of the first transmissive plate comprising a first surface sag based at least in part on a cubic function, and the second side of the second transmissive plate comprising a second surface sag based at least in part on an inverse of the cubic function, the DOE being disposed between and adjacent to the first side of the first transmissive plate and the first side of the second transmissive plate, and wherein the DOE is encoded with refractive lens information corresponding to the inverse of the cubic function.

13. The method of claim 12, further comprising:
    laterally translating the DOE in relation to the first transmissive plate such that light rays associated with the virtual content delivered to the DOE diverge at varying angles based at least in part on the lateral translation.

14. The method of claim 13, wherein the divergent light rays are perceived by the user as coming from a depth plane other than optical infinity.

15. The method of claim 13, further comprising tracking a vergence of the user's eye, wherein the DOE is laterally translated based at least in part on the tracked vergence of the user's eyes.

16. The method of claim 12, wherein the second transmissive plate is placed in relation to the DOE and the first transmissive plate such that outside world objects, when viewed by the user through the lens assembly and the DOE, are perceived through zero optical power.

17. The method of claim 12, wherein the second transmissive plate is offset in a first direction in relation to the DOE and the first transmissive plate such that outside world objects, when viewed by the user through the lens assembly and the DOE are perceived as having a positive optical power.

18. The method of claim 17, wherein the second transmissive plate is offset in a second direction in relation to the DOE and the first transmissive plate such that outside world objects, when viewed by the user through the lens assembly and the DOE are perceived as having a negative optical power.

19. The method of claim 18, wherein the first direction is opposite to the second direction.

20. The method of claim 12, wherein the system generates collimated light rays associated with the virtual content that appear to emanate from optical infinity.

21. The method of claim 12, further comprising delivering one or more frames of virtual content to the DOE in a time-sequential manner.

22. The method of claim 21, wherein the DOE is laterally translated in relation to the first transmissive plate on a frame-to-frame basis.

23. The method of claim 21, wherein the one or more frames of virtual content delivered to the DOE comprise two-dimensional image slices of one or more three-dimensional objects.

* * * * *